US 8,639,736 B2

(12) United States Patent
Lim et al.

(10) Patent No.: US 8,639,736 B2
(45) Date of Patent: Jan. 28, 2014

(54) METHOD AND APPARATUS FOR DETECTING SIGNAL USING CYCLO-STATIONARY CHARACTERISITICS

(75) Inventors: Sunmin Lim, Daejeon (KR); Sang-Won Kim, Daejeon (KR); Changhyun Park, Daejeon (KR); Myung Sun Song, Daejeon (KR); Gwangzeen Ko, Daejeon (KR); Chang-Joo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 979 days.

(21) Appl. No.: 12/678,228

(22) PCT Filed: Aug. 21, 2008

(86) PCT No.: PCT/KR2008/004863
§ 371 (c)(1),
(2), (4) Date: Mar. 15, 2010

(87) PCT Pub. No.: WO2009/035221
PCT Pub. Date: Mar. 19, 2009

(65) Prior Publication Data
US 2010/0205234 A1    Aug. 12, 2010

(30) Foreign Application Priority Data

Sep. 14, 2007  (KR) .................. 10-2007-0093709
May 26, 2008  (KR) .................. 10-2008-0048543

(51) Int. Cl.
*H04L 27/00* (2006.01)
*H04L 27/06* (2006.01)
*G06F 17/14* (2006.01)

(52) U.S. Cl.
USPC ........... 708/205; 708/403; 708/620; 375/219; 375/343

(58) Field of Classification Search
USPC ................... 708/205, 620, 403; 375/219, 343
See application file for complete search history.

(56) References Cited

U.S. PATENT DOCUMENTS 8,045,655 B2 *  10/2011  Ashish .......................... 375/343
2007/0100922 A1    5/2007  Ashish
2009/0003418 A1 *  1/2009  Karabinis ..................... 375/219

FOREIGN PATENT DOCUMENTS

KR   10-20070048576   5/2007
WO   WO 2007/083269   7/2007

OTHER PUBLICATIONS

W.A. Gardner, "Exploitations of spectral redundancy in cyclostationary signals," IEEE Signal Processing Magazine, vol. 8, No. 2, pp. 14-36, Apr. 1991.*

* cited by examiner

*Primary Examiner* — Tammara Peyton
(74) *Attorney, Agent, or Firm* — Staas & Halsey LLP

(57) ABSTRACT

A method and apparatus for detecting a signal using a cyclostationary characteristic value is provided. A method of detecting a signal using a cyclo-stationary characteristic value includes: calculating cyclo-stationary characteristic values with respect to a cyclic frequency domain of an input signal; multiplying the calculated cyclo-stationary characteristic values with each other; and detecting the signal from the input signal based on the result of the multiplication.

16 Claims, 6 Drawing Sheets

METHOD AND APPARATUS FOR DETECTING SIGNAL USING CYCLO-STATIONARY CHARACTERISITICS

TECHNICAL FIELD

The present invention relates to a method and apparatus for detecting a signal using a cyclo-stationary characteristic value.

This work was supported by the IT R&D program of MIC/IITA. [2007-S-002-03, Development of cognitive radio technology for efficient spectrum utilization]

BACKGROUND ART

In an existing signal detection algorithm using a cyclo-stationary characteristic value, a threshold value used for determining whether a signal exists is obtained by applying a temporal average with respect to a summation of cyclo-stationary characteristic values of collected signals. Through the temporal average, the signal detection algorithm can detect a signal by reducing the variance of cyclo-stationary characteristics generated from noise, maintaining cyclo-stationary characteristics of the signals, and relatively emphasizing the cyclo-stationary characteristics in comparison to the noise characteristic.

However, in the case of the signal detection algorithm, when the cyclo-stationary characteristic of the signal is relatively small due to a channel environment and the like, there is a very small difference between a threshold value and a peak value indicating signal characteristics, despite using signals that have been collected for a long period of time. Therefore, it may be difficult to determine whether a signal exists. When an error exists in the threshold value, it may have significant impact on the detection performance. Also, the signal detection algorithm uses a frequency domain signal converted by a fast Fourier transform (FFT). As a number of fast Fourier transformed points increases, a calculation amount may increase.

Although the signal detection scheme using the cyclo-stationary characteristic value has the excellent performance, the above-described disadvantages may constrain the actual usage of the signal detection scheme. Therefore, there is a need for a method that can maintain advantages of the signal detection scheme using the cyclo-stationary characteristic and also can overcome the above-described disadvantages.

DISCLOSURE OF INVENTION

Technical Goals

An aspect of the present invention provides a signal detection method and apparatus using a cyclo-stationary characteristic value that can detect a signal using a cyclo-stationary characteristic value.

Another aspect of the present invention also provides a signal detection method and apparatus using a cyclo-stationary characteristic value that can partially calculate a cyclo-stationary characteristic value when detecting a signal using the cyclo-stationary characteristic value, and thereby can reduce the computational complexity and also effectively enable spectrum sensing.

Another aspect of the present invention also provides a signal detection method and apparatus using a cyclo-stationary characteristic value that can normalize cyclo-stationary characteristic values and thereby can apply the same threshold value regardless of a change in a noise signal in a real-world environment.

Another aspect of the present invention also provides a signal detection method and apparatus using a cyclo-stationary characteristic value that can reduce the change in the detection performance, which may occur due to an error in a threshold value, based on the result of multiplication with respect to cyclo-stationary characteristic values, that is, signal characteristic values.

The present invention is not limited to the above purposes and other purposes not described herein will be apparent to those of skill in the art from the following description.

Technical Solutions

According to an aspect of the present invention, there is provided a method of detecting a signal using a cyclo-stationary characteristic value, the method including: calculating cyclo-stationary characteristic values with respect to a cyclic frequency domain of an input signal; multiplying the calculated cyclo-stationary characteristic values with each other; and detecting the signal from the input signal based on the result of the multiplication.

In this instance, the calculating may include: converting the input signal into a frequency domain signal using a Fourier transform; segmenting the cyclic frequency domain of the converted frequency domain signal into partial unit domains; selecting, from the partial unit domains, a first partial unit domain that is predicted to show a cyclo-stationary characteristic; and calculating cyclo-stationary characteristic values with respect to the selected first partial unit domain.

Also, the calculating may include: converting the input signal into a frequency domain signal using a Fourier transform; segmenting the cyclic frequency domain of the converted frequency domain signal into partial unit domains; selecting, from the partial unit domains, a first partial unit domain that is predicted to show a cyclo-stationary characteristic; and calculating the cyclo-stationary characteristic values using a maximum value among frequency components of cyclic frequencies that are included in the selected first partial unit domain.

Also, the calculating may include: converting the input signal into a frequency domain signal using a Fourier transform; segmenting the cyclic frequency domain of the converted frequency domain signal into partial unit domains; selecting, from the partial unit domains, a first partial unit domain that is predicted to show a cyclo-stationary characteristic; and calculating the cyclo-stationary characteristic values by changing a number of calculations with respect to the selected first partial unit domain and a second partial unit domain excluding the first partial unit domain from the partial unit domains.

Also, the method may further include normalizing the calculated cyclo-stationary characteristic values.

Also, the normalizing may include normalizing the cyclo-stationary characteristic values based on a root means square (RMS) value of the cyclo-stationary characteristic value of the input signal.

Also, the detecting may include: comparing the result of the multiplication with a predetermined threshold value; and when the result of the multiplication is greater than the threshold value, determining the signal exists in the input signal to detect the signal from the input signal.

According to another aspect of the present invention, there is provided a method of detecting a signal using a cyclo-stationary characteristic value, the method including: calculating cyclo-stationary characteristic values with respect to a cyclic frequency domain of an input signal; normalizing the calculated cyclo-stationary characteristic values; multiplying the normalized cyclo-stationary characteristic values with each other to obtain the result of the multiplication; and detecting the signal from the input signal based on the result of the multiplication.

In this instance, the normalizing may include normalizing each of the cyclo-stationary characteristic values based on an RMS value.

According to still another aspect of the present invention, there is provided an apparatus for detecting a signal using a cyclo-stationary characteristic value, the method including: a calculation unit configured to calculate cyclo-stationary characteristic values with respect to a cyclic frequency domain of an input signal and multiply the calculated cyclo-stationary characteristic values; and a detection unit configured to detect the signal from the input signal based on the result of the multiplication.

In this instance, the calculation unit may convert the input signal into a frequency domain signal using a Fourier transform, divide the cyclic frequency domain of the converted frequency domain signal into partial unit domains, select, from the partial unit domains, a first partial unit domain that is predicted to show a cyclo-stationary characteristic, and calculate the cyclo-stationary characteristic values using a maximum value among frequency components of cyclic frequencies that are included in the selected first partial unit domain.

Also, the calculation unit may convert the input signal into a frequency domain signal using a Fourier transform, divide the cyclic frequency domain of the converted frequency domain signal into partial unit domains, select, from the partial unit domains, a first partial unit domain that is predicted to show a cyclo-stationary characteristic, and calculate the cyclo-stationary characteristic values by changing a number of calculations with respect to the selected first partial unit domain and a second partial unit domain excluding the first partial unit domain from the partial unit domains.

Also, the calculation unit may normalize the cyclo-stationary characteristic values based on an RMS value of the cyclo-stationary characteristic value of the input signal.

Also, the detection unit may compare the result of the multiplication with a predetermined threshold value, and when the result of the multiplication is greater than the threshold value, determine the signal exists in the input signal to detect the signal from the input signal.

According to yet another aspect of the present invention, there is provided an apparatus for detecting a signal using a cyclo-stationary characteristic value, the apparatus including: a calculation unit configured to calculate cyclo-stationary characteristic values with respect to a cyclic frequency domain of an input signal, normalize the calculated cyclo-stationary characteristic values, and multiply the normalized cyclo-stationary characteristic values with each other; and a detection unit configured to detect the signal from the input signal based on the result of the multiplication.

In this instance, the calculation unit may normalizing each of the cyclo-stationary characteristic values based on an RMS value.

Additional aspects, features, and/or advantages of the invention will be set forth in part in the description which follows and, in part, will be apparent from the description, or may be learned by practice of the invention.

BEST MODE FOR CARRYING OUT THE INVENTION

Figure 1:
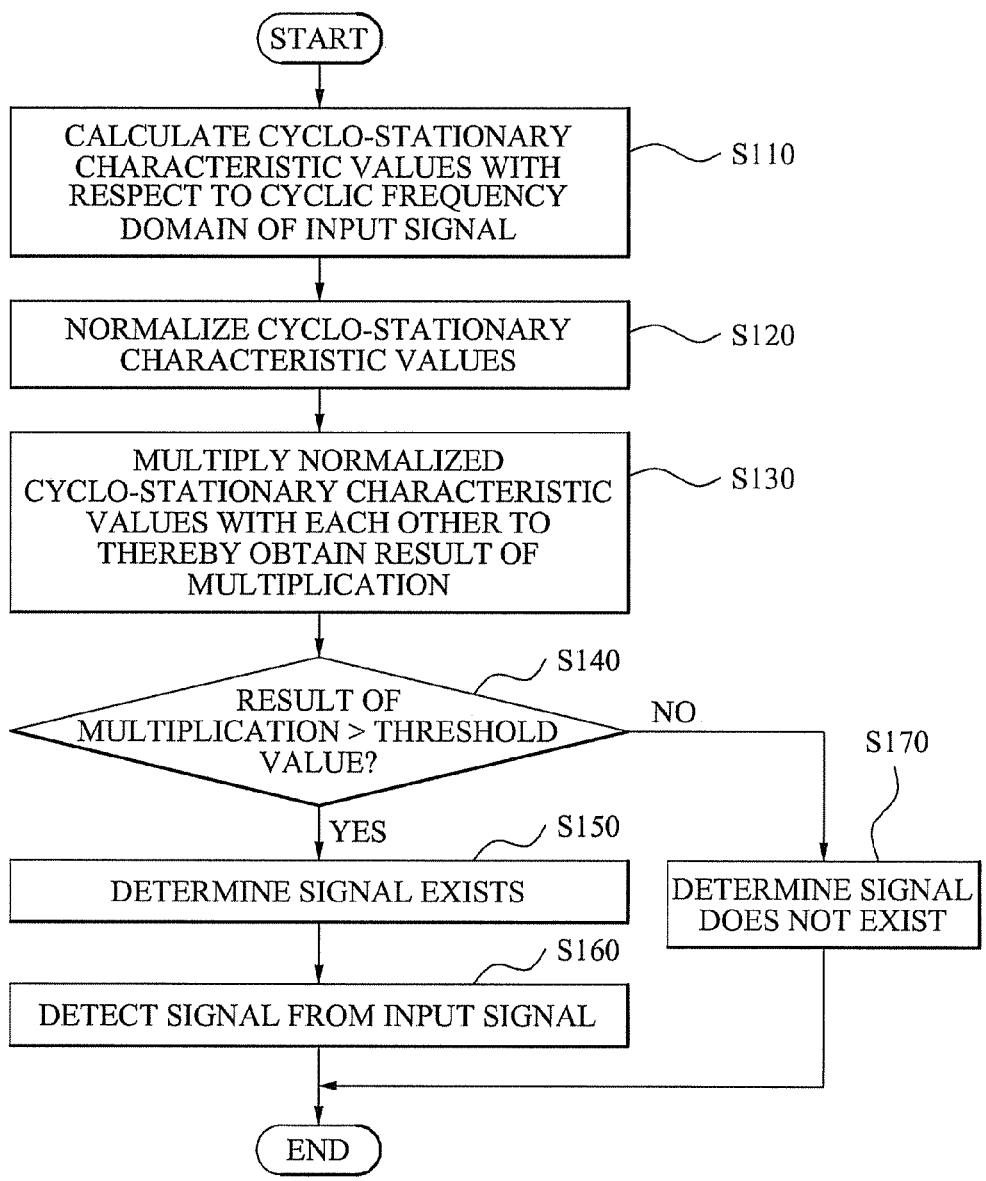
FIG. 1 is a flowchart illustrating a method of detecting a signal using a cyclo-stationary characteristic value according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a flowchart illustrating a method of detecting a signal using a cyclo-stationary characteristic value according to an embodiment of the present invention. The signal detection method may be performed by a signal detection apparatus using a cyclo-stationary characteristic value according to the present invention.

Referring to FIG. 1, in operation S110, the signal detection apparatus may calculate cyclo-stationary characteristic values with respect to a cyclic frequency domain of an input signal.

Specifically, the signal detection apparatus may perform a Fourier transform for a received signal collected as the input signal to thereby convert the input signal into a frequency domain signal. The signal detection apparatus may segmenting a cyclic frequency domain of the converted frequency domain signal into partial unit domains. Also, the signal detection apparatus may select, from the partial unit domains, a first partial unit domain that is predicted to show a cyclo-stationary characteristic, and calculate the cyclo-stationary values with respect to the selected partial unit domain.

In this instance, the signal detection apparatus may extract frequency components of cyclic frequencies in the selected partial unit domain, and calculate the cyclo-stationary characteristic values using a maximum value among the extracted frequency components.

Also, the Fourier transform may include a fast Fourier transform (FFT) or a discrete Fourier transform (DFT). In the present embodiment, the signal detection apparatus may convert the input signal into the frequency domain signal using the FFT.

Figure 2:
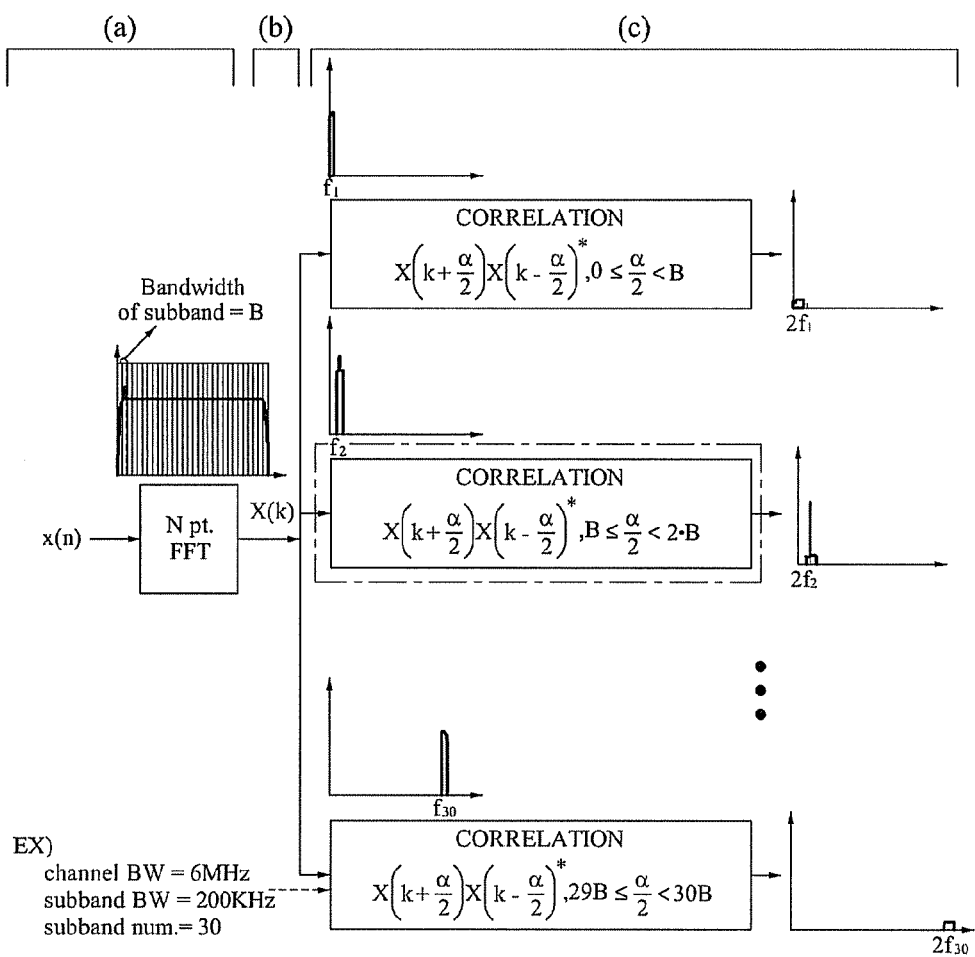
FIG. 2 illustrates an example of a power spectrum showing a cyclo-stationary characteristic of an Advanced Television System Committee (ATSC) digital television (DTV) signal in a frequency domain and in a cyclic frequency domain according to an embodiment of the present invention.

FIG. 2 illustrates an example of a power spectrum showing cyclo-stationary characteristic of an Advanced Television System Committee (ATSC) digital television (DTV) signal in a frequency domain and in a cyclic frequency domain according to an embodiment of the present invention. With the assumption that a sampling frequency is 21.52 MHz and a central frequency is 5.39 MHz, FIG. 2 shows both a cyclic frequency domain frequency characteristic and frequency domain characteristic with respect to the ATSC DTV signal.

As shown in FIG. 2, in the ATSC DTV signal, a pilot signal appears in about 2.69 MHz of the frequency domain and the cyclo-stationary characteristic appears in about 5.38 MHz of the cyclic frequency domain corresponding to twice the pilot frequency, that is, 2.69 MHz×2. In this case, a conventional signal detection apparatus calculates the cyclo-stationary characteristic value using both the frequency domain and the cyclic frequency domain. Therefore, the conventional signal detection apparatus needs a large amount of memory for the calculation. Specifically, since the conventional signal detection apparatus needs the large amount of memory when a number of fast Fourier transform points is large, the conventional signal detection apparatus is very ineffective.

However, a signal detection apparatus according to the present invention may obtain a maximum value among power spectrum values of the frequency domain based on the cyclic frequency domain and then obtain a cyclo-stationary characteristic value in each cyclic frequency value using the maximum value, to determine whether a signal exists. Specifically, the signal detection apparatus may simplify a three-dimensional (3D) data value to a two-dimensional (2D) data value and calculate the cyclo-stationary characteristic value based on the simplified data value.

In this instance, the signal detection apparatus does not need to calculate the cyclo-stationary characteristic value with respect to the entire cyclic frequency domain. Specifically, the signal detection apparatus may calculate the cyclo-stationary characteristic value with respect to only a portion that includes a pilot signal in the entire cyclic frequency domain. This is because, in the case of the ATSC DTV signal, only the pilot signal in a fixed location indicates the cyclo-stationary characteristic.

Figure 3:
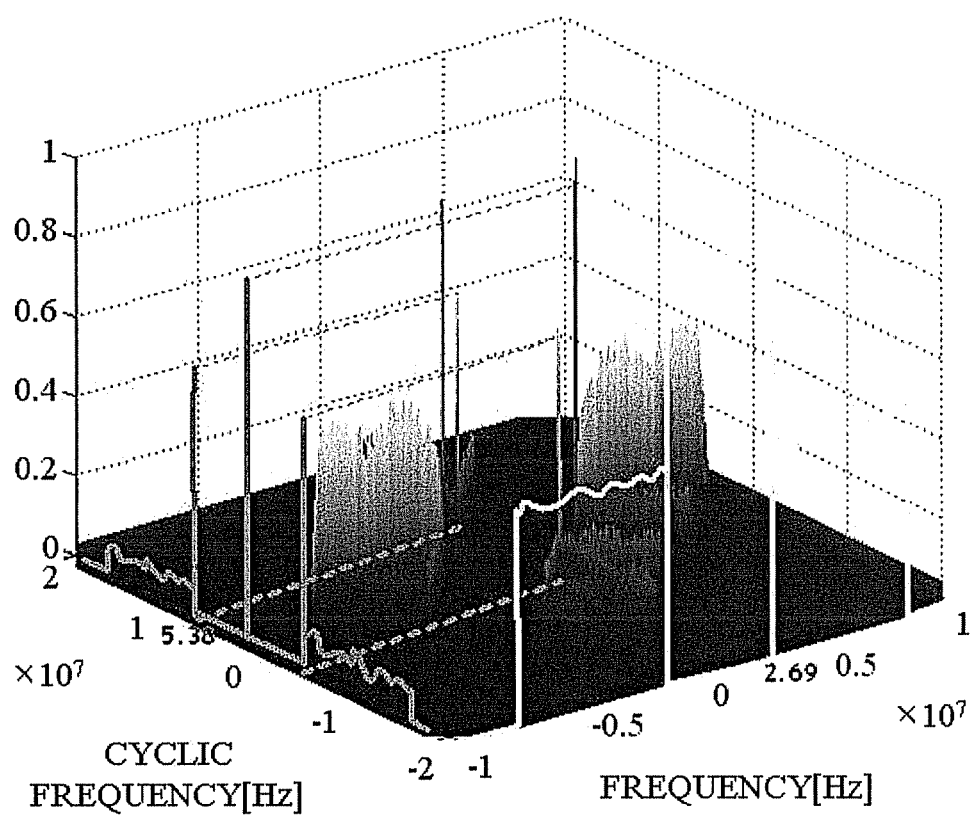
FIG. 3 illustrates an example of calculating a cyclo-stationary characteristic value according to an embodiment of the present invention.

FIG. 3 illustrates an example of calculating a cyclo-stationary characteristic value according to an embodiment of the present invention.

Referring to FIG. 3, the signal detection apparatus may convert the collected data(the input signal) into a frequency domain signal via an FFT and divide a cyclic frequency domain of the frequency domain signal into partial unit domains. The signal detection apparatus may calculate a cyclo-stationary characteristic value with respect to a partial unit domain that is predicted to show a cyclo-stationary characteristic, that is, with respect to a predicted cyclic frequency domain among the divided partial unit domains.

Also, in the case of another cyclic frequency domain excluding the predicted cyclic frequency domain from the entire cyclic frequency domain, the signal detection apparatus may calculate the cyclo-stationary characteristic value by reducing the number of calculations, compared to when calculating the cyclo-stationary characteristic value with respect to the predicted cyclic frequency domain. Specifically, the signal detection apparatus may be dedicated to calculating the cyclo-stationary characteristic value with respect to the predicted cyclic frequency domain.

For example, with the assumption that the cyclo-stationary characteristic value is calculated using a signal that is collected ten times at a time interval of 1 ms, the signal detection apparatus may calculate the cyclo-stationary characteristic value of the ten-times-collected signal with respect to the predicted cyclic frequency domain. Conversely, with respect to the cyclic frequency domain excluding the predicted cyclic frequency domain, the signal detection apparatus may calculate the cyclo-stationary characteristic value only twice.

As described above, the signal detection apparatus may partially calculate the cyclo-stationary characteristic value and thereby reduce the computational complexity and effectively enable spectrum sensing.

Referring again to FIG. 1, in operation S120, the signal detection apparatus may normalize the calculated cyclo-stationary characteristic values. In this instance, the signal detection apparatus may normalize the cyclo-stationary characteristic values based on an effective value of the cyclo-stationary characteristic value of the input signal.

Specifically, since a noise level of the input signal is different based on a measured time and a measured location, the noise level of the input may have a different value, for example, 1 in location A and 1.1 in location B. The signal detection apparatus may normalize the different noise levels based on a root mean square (RMS) value of the input signal, so that the different noise levels may have the same value regardless of the measured time and the measured location. For example, the signal detection apparatus may normalize a value of the location A to 1/1 and a value of the location B to 1.1/1.1, so that the locations A and B may have the same value of 1. Therefore, when applying the cyclo-stationary characteristic value of the input signal in a real-world environment with different measured times and measured locations, the signal detection apparatus may apply the same threshold value regardless of the change in the noise signal of the input signal.

In operation S130, the signal detection apparatus may multiply the normalized cyclo-stationary characteristic values with each other to thereby obtain the result of the multiplication.

Accordingly, the signal detection apparatus may reduce the change in the detection performance, which may occur due to an error in the threshold value, based on the result of multiplication of cyclo-stationary characteristic values, that is, signal characteristic values.

The signal detection apparatus may detect a signal from the input signal based on the result of the multiplication. Specifically, the signal detection apparatus may compare the result of the multiplication with a predetermined threshold value in operation S140. When the result of the multiplication is greater than the threshold value, that is, the yes direction in operation S140, the signal detection apparatus may determine the signal exists in the input signal in operation S150.

In operation S160, the signal detection apparatus may detect the signal from the input signal.

Conversely, when the result of the multiplication is less than or equal to the threshold value, that is, the no direction in operation S140, the signal detection apparatus may determine the signal is not included in the input signal in operation S170. Therefore, the signal detection apparatus does not detect the signal from the input signal.

Hereinafter, a method of detecting a signal using a cyclo-stationary characteristic value according to an embodiment of the present invention will be described in detail.

In the following Equation 1, s(i) denotes a collected signal, x(n) denotes a signal that is generated by cutting the collected signal s(i) with a predetermined window size, and X(k) denotes a signal that is fast Fourier transformed from the signal x(n).

$$s(i), \quad 1 \le i \le M, \qquad \text{[Equation 1]}$$

$$x(n) = [s(n) \quad s(n-1) \quad \ldots \quad s(n-N+1)],$$

$$N \le n \le M,$$

$$X(n,k) = \sum_{p=0}^{N-1} s(n+p) e^{\frac{-j2\pi p}{N}k}, \quad -\frac{N}{2} \le k \le \frac{N}{2}.$$

In this case, the signal detection apparatus may calculate a cyclo-stationary characteristic value with respect to the collected signal using a frequency domain signal X(n,k). Specifically, the signal detection apparatus may calculate the cyclo-stationary characteristic value $S_x^\alpha(n,k)$ with respect to the collected signal, which is given by, $$S_x^\alpha(n, k) = X\left(n, k + \frac{\alpha}{2}\right)X^*\left(n, k - \frac{\alpha}{2}\right).\quad\text{[Equation 2]}$$

In this instance, the calculated cyclo-stationary characteristic value according to Equation 2 has a 3D value with frequency k, cyclic frequency $\alpha$, and magnitude $|S_x^\alpha|$. When performing the signal detection based on all the information such as the frequency k, the cyclic frequency $\alpha$, and the magnitude $|S_x^\alpha|$, a large amount of memory may be required. Therefore, the signal detection apparatus may calculate the cyclo-stationary characteristic value of the signal using only the magnitude $|S_x^\alpha|$ with respect to the cyclic frequency $\alpha$. Specifically, the signal detection apparatus may calculate a final cyclo-stationary characteristic value using a component with a maximum value among frequency components with respect to each cyclic frequency a stationary $\alpha$, which may be represented as, $$I(n, \alpha) = \max_{k}(S_x^\alpha(n, k)).\quad\text{[Equation 3]}$$

In a real-world environment, even when the received signal is noise, the result of Equation 3 may change according to the change in the environment and frequency. Therefore, it is difficult to directly use the result value of Equation 3 as a threshold value index for the signal detection. Therefore, according to an embodiment of the present invention, the signal detection apparatus may normalize a signal based on an RMS value of a cyclo-stationary characteristic value of the received signal. It may be represented as, $$\bar{I}(n, \alpha) = \frac{I(n, \alpha)}{\sqrt{\frac{\sum_{a=0}^{N-1} I(n, \alpha)}{N}}}\quad\text{[Equation 4]}$$

In Equation 4, even though a noise level changes, when normalizing the result value of Equation 3, that is, the cyclo-stationary characteristic value based on the RMS value, the cyclo-stationary characteristic value may maintain a value near '1' at all times. Therefore, when normalizing the cyclo-stationary characteristic value based on the RMS value, the signal detection apparatus does not need to change the threshold value according to the environment.

In the case of the conventional art, the cyclo-stationary characteristic value of the received signal is obtained through the temporal average of a summation of normalized cyclo-stationary characteristic values over the entire receiving time, as given by, $$\text{sum}\_\bar{I}(\alpha) = \frac{1}{M - N + 1}\sum_{n=N}^{M}\bar{I}(n, \alpha).\quad\text{[Equation 5]}$$

However, in this case, the cyclo-stationary characteristic of the signal is reduced and appears very small due to environmental elements such as fading. Therefore, according to the conventional art, it is difficult to discern a signal from noise.

In order to solve the above problems, the signal detection apparatus according to the present invention may determine a threshold value according to a false alarm probability, using a probability distribution probability of the cyclo-stationary signal characteristic values that are obtained from Equation 5 using only the noise signal. The signal detection apparatus may discern the signal from the noise based on the determined threshold value.

However, when obtaining the temporal average for a summation of normalized cyclo-stationary characteristic values, the variance may be reduced over time and the threshold value may have a value near '1'. Specifically, when an error occurs in the threshold value and thereby the cyclo-stationary signal characteristic of the signal is decreased due to fading and the like, the detection performance may be significantly deteriorated. Therefore, in order to solve the disadvantage due to the temporal average for the summation of the normalized cyclo-stationary characteristic values, according to an embodiment of the present invention, it is possible to obtain a temporal average cyclo-stationary characteristic value through the multiplication of the normalized cyclo-stationary characteristic values, as given by, $$\text{mul}\_\bar{I}(\alpha) = \prod_{n=N}^{M}\bar{I}(n, \alpha).\quad\text{[Equation 6]}$$

In this case, noise signal $\bar{I}(n,\alpha)$ may randomly appear as values near '1'. Therefore, although capturing takes a significant amount of time, the noise signal may have a value near '1'. However, if the noise signal and a signal with cyclo-stationary characteristic coexist, then $\bar{I}(n,\alpha')=v(n)$ is greater than or equal to 1 in cyclic frequency $\alpha'$, and Equation 6 may be represented as the following Equation 7. Therefore, if $v(n)=1.1$ and $M-N+1=50$, the noise signal may have a value of about $1.1^{50}\approx 117$. Therefore, compared to when using the summation, signals may be more easily detected. As described above, the signal detection apparatus may readily detect a signal using the multiplication of cyclo-stationary characteristic values.

$$\text{mul}\_\bar{I}(\alpha') = \prod_{n=N}^{M}\bar{I}(n, \alpha') = \prod_{n=N}^{M}v(n).\quad\text{[Equation 7]}$$

As shown in the following Equation 8, the signal detection apparatus may obtain a characteristic value using the result of Equation 6 and then compare the obtained characteristic value with a threshold value. When the characteristic value is greater than the threshold value, the signal detection apparatus may determine the signal is included. According to an aspect of the present invention, the characteristic value may be obtained using the result obtained by multiplying the cyclo-stationary characteristic values. For example, the characteristic value may include a summation of cyclic frequency values of Equation 6 or the average thereof, or a maximum value of the cyclic frequency values of Equation 6, a location of the maximum value, and the like.

$$\hat{I}=C(\text{mul}\_\bar{I}(\alpha)).\quad\text{[Equation 8]}$$

Figure 4:
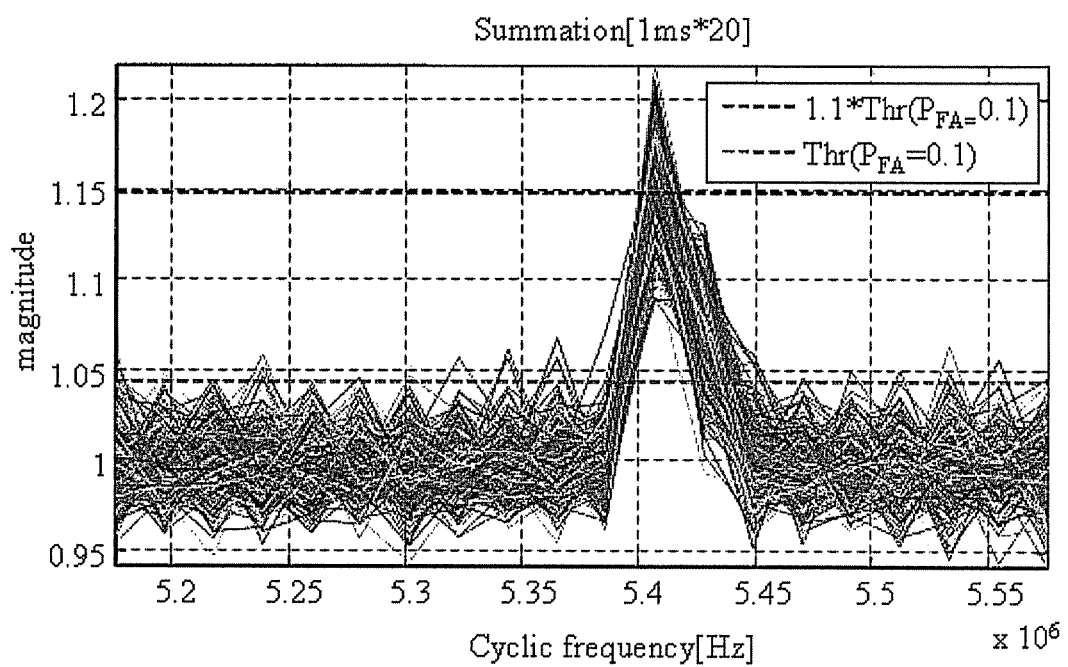
FIG. 4 is a graph illustrating a temporal average characteristic for a summation of two-dimensional (2D) cyclo-stationary characteristic values according to a conventional art.
Figure 5:
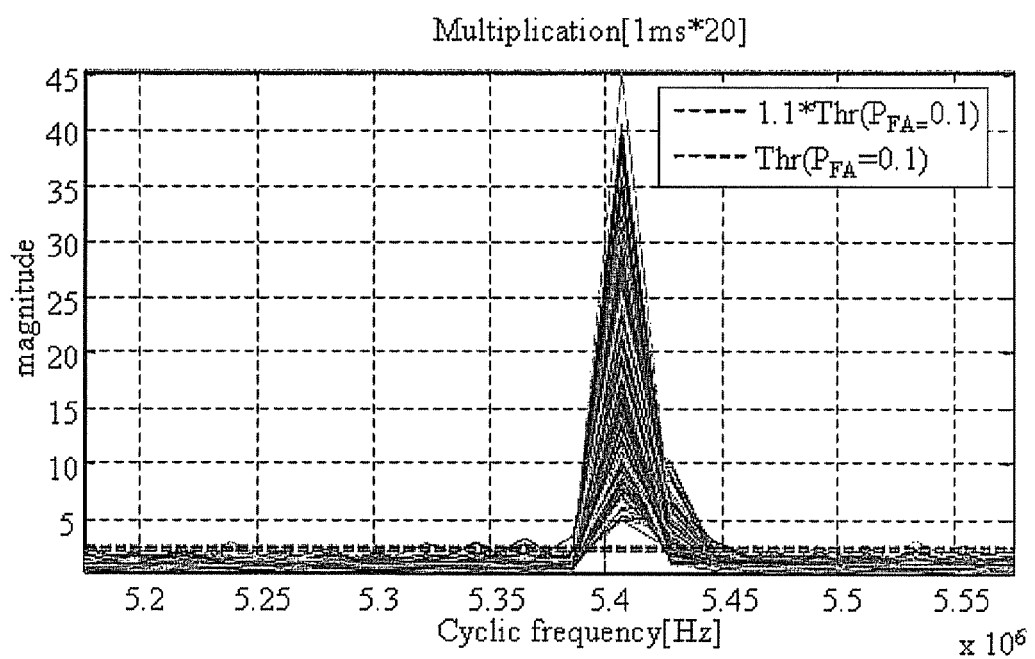
FIG. 5 is a graph illustrating a temporal average characteristic for the multiplication of 2D cyclo-stationary characteristic values according to an embodiment of the present invention.

FIG. 4 is a graph illustrating a temporal average characteristic for a summation of two-dimensional (2D) cyclo-stationary characteristic values according to a conventional art, and FIG. 5 is a graph illustrating a temporal average characteristic for the multiplication of 2D cyclo-stationary characteristic values according to an embodiment of the present invention. In particular, FIGS. 4 and 5 show how the result of the summation of cyclo-stationary characteristic values and the result of the multiplication thereof affect the signal detection result according to an error in a threshold value, based on the comparison therebetween.

Referring to FIGS. 4 and 5, signal "WAS_32_48_06012000_OPT" provided by an Institute of Electrical and Electronics Engineers (IEEE) 802.22 Wireless Regional Area Networks (WRAN) standardization team corresponds to a signal that was captured in Washington. The cyclic-stationary characteristic was studied with respect to a partial band of 200 KHz with a pilot of a cyclic frequency domain. The simulation test environment shows 250 signals of 20 ms units in Signal to Noise Ratio (SNR)=−22 dB. The characteristic value used herein was determined by selecting a maximum value from values of Equation 6. In the case of an ideal environment where an error does not occur, both the summation of cyclo-stationary characteristic values and the multiplication of cyclo-stationary characteristic values are greater than the threshold value and thus there is no problem in the signal detection. However, when the error occurs in the threshold value, a problem may occur. For example, when an error of about 10% occurs in the threshold value, the result of the multiplication is greater than the threshold value (see FIG. 5), whereas the result of the summation may be less than the threshold value (see FIG. 4). Therefore, when a pilot characteristic is reduced due to fading, the variance characteristic caused by noise is reduced through the summation, but a value of a pilot portion is significantly reduced. Consequently, even when a small error occurs in the threshold value, the detection performance may be significantly deteriorated. Specifically, as shown in FIG. 5, when a signal is detected based on the multiplication of cyclo-stationary characteristic values, the threshold value may be robust against the error.

The exemplary embodiments of the present invention include computer-readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 6:
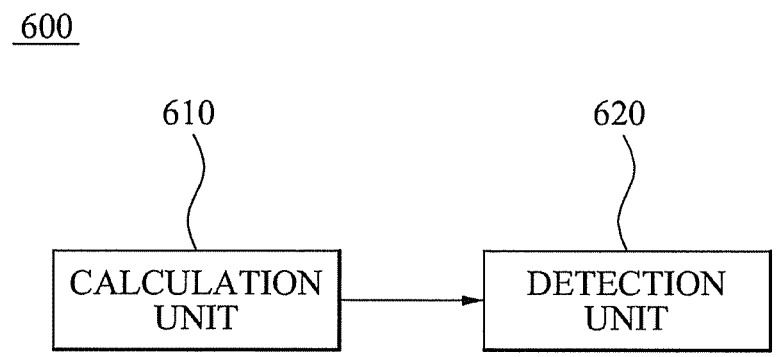
FIG. 6 is a block diagram illustrating an apparatus for detecting a signal using cyclo-stationary characteristics according to an embodiment of the present invention.

FIG. 6 is a block diagram illustrating an apparatus 600 for detecting a signal using cyclo-stationary characteristics according to an embodiment of the present invention.

Referring to FIG. 6, the signal detection apparatus 600 may include a calculation unit 610 and a detection unit 620.

The calculation unit 610 may calculate cyclo-stationary characteristic values with respect to a cyclic frequency domain of an input signal.

Specifically, the calculation unit 610 may perform a Fourier transform for a received signal collected as the input signal to thereby convert the input signal into a frequency domain signal. The calculation unit 610 may divide a cyclic frequency domain of the converted frequency domain signal into partial unit domains. Also, the calculation unit 610 may select, from the partial unit domains, a first partial unit domain that is predicted to show cyclo-stationary characteristics and calculate the cyclo-stationary values with respect to the selected partial unit domain.

In this instance, the calculation unit 610 may extract frequency components of cyclic frequencies in the selected partial unit domain, and calculate the cyclo-stationary characteristic values using a maximum value among the extracted frequency components.

Also, the Fourier transform may include an FFT or a DFT. In the present embodiment, the calculation unit 610 may convert the input signal into the frequency domain signal using the FFT.

As described above, the calculation unit 610 may partially calculate the cyclo-stationary characteristic value and thereby reduce the computational complexity and effectively enable spectrum sensing.

The calculation unit 610 may normalize the calculated cyclo-stationary characteristic values. In this instance, the calculation unit 610 may normalize the cyclo-stationary characteristic values based on an RMS value of the cyclo-stationary characteristic value of the input signal.

As described above, the calculation unit 610 may normalize the cyclo-stationary characteristics and thereby maintain the robust cyclo-stationary characteristic even in a real-world environment.

The calculation unit 610 may multiply the normalized cyclo-stationary characteristic values with each other to thereby obtain the result of the multiplication. Accordingly, the calculation unit 610 may reduce the change in the detection performance, which may occur due to an error in the threshold value, based on the result of multiplication of cyclo-stationary characteristic values, that is, signal characteristic values.

The detection unit 620 may detect a signal from the input signal based on the result of the multiplication. Specifically, the detection unit 620 may compare the result of the multiplication with a predetermined threshold value. When the result of the multiplication is greater than the threshold value, the detection unit 620 may determine the signal exists in the input signal.

As the signal exists in the input signal, the detection unit 620 may detect the signal from the input signal.

Conversely, when the result of the multiplication is less than or equal to, the detection unit 620 may determine the signal is not included in the input signal. Therefore, the detection unit 620 does not detect the signal from the input signal.

As described above, according to the present invention, it is possible to detect a signal using a cyclo-stationary characteristic value.

Also, according to the present invention, it is possible to partially calculate a cyclo-stationary characteristic value when detecting a signal using the cyclo-stationary characteristic value, and thereby reduce the computational complexity and also effectively enable spectrum sensing.

Also, according to the present invention, it is possible to normalize cyclo-stationary characteristic values and thereby apply the same threshold value regardless of a change in a noise signal in a real-world environment.

Also, according to the present invention, it is possible to reduce the change in the detection performance, which may occur due to an error in a threshold value, based on the result of multiplication with respect to cyclo-stationary characteristic values, that is, signal characteristic values.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of detecting a signal using a cyclo-stationary characteristic value, the method comprising:
calculating, by way of one or more processors, cyclo-stationary characteristic values with respect to a cyclic frequency domain of an input signal;
multiplying the calculated cyclo-stationary characteristic values with each other; and
detecting the signal from the input signal based on the result of the multiplication,
wherein the calculating comprises:
converting the input signal into a frequency domain signal using a Fourier transform;
segmenting the cyclic frequency domain of the converted frequency domain signal into partial unit domains; and
selecting, from the partial unit domains, a first partial unit domain that is predicted to show a cyclo-stationary characteristic.

2. The method of claim 1, wherein the calculating further comprises:
calculating cyclo-stationary characteristic values with respect to the selected first partial unit domain.

3. The method of claim 1, wherein the calculating comprises:
calculating the cyclo-stationary characteristic values using a maximum value among frequency components of cyclic frequencies that are included in the selected first partial unit domain.

4. The method of claim 1, wherein the calculating comprises:
calculating the cyclo-stationary characteristic values by changing a number of calculations with respect to the selected first partial unit domain and a second partial unit domain excluding the first partial unit domain from the partial unit domains.

5. The method of claim 1, further comprising:
normalizing the calculated cyclo-stationary characteristic values.

6. The method of claim 5, wherein the normalizing comprises normalizing the cyclo-stationary characteristic values based on a root means square (RMS) value of the cyclo-stationary characteristic value of the input signal.

7. The method of claim 1, wherein the detecting comprises:
comparing the result of the multiplication with a predetermined threshold value; and
when the result of the multiplication is greater than the threshold value, determining the signal exists in the input signal to detect the signal from the input signal.

8. A method of detecting a signal using a cyclo-stationary characteristic value, the method comprising:
calculating, by way of one or more processors, cyclo-stationary characteristic values with respect to a cyclic frequency domain of an input signal;
normalizing the calculated cyclo-stationary characteristic values;
multiplying the normalized cyclo-stationary characteristic values with each other to obtain the result of the multiplication; and
detecting the signal from the input signal based on the result of the multiplication.

9. The method of claim 8, wherein the normalizing comprises normalizing each of the cyclo-stationary characteristic values based on an RMS value.

10. An apparatus for detecting a signal using a cyclo-stationary characteristic value, the method comprising:
a processor to control each of the following units;
a calculation unit configured to calculate cyclo-stationary characteristic values with respect to a cyclic frequency domain of an input signal and multiply the calculated cyclo-stationary characteristic values; and
a detection unit configured to detect the signal from the input signal based on the result of the multiplication,
wherein the calculation unit is configured to convert the input signal into a frequency domain signal using a Fourier transform, divide the cyclic frequency domain of the converted frequency domain signal into partial unit domains, and select, from the partial unit domains, a first partial unit domain that is predicted to show a cyclo-stationary characteristic.

11. The apparatus of claim 10, wherein the calculation unit is further configured to calculate the cyclo-stationary characteristic values using a maximum value among frequency components of cyclic frequencies that are included in the selected first partial unit domain.

12. The apparatus of claim 10, wherein the calculation unit is further configured to calculate the cyclo-stationary characteristic values by changing a number of calculations with respect to the selected first partial unit domain and a second partial unit domain excluding the first partial unit domain from the partial unit domains.

13. The apparatus of claim 10, wherein the calculation unit is configured to normalize the cyclo-stationary characteristic values based on an RMS value of the cyclo-stationary characteristic value of the input signal.

14. The apparatus of claim 10, wherein the detection unit is configured to compare the result of the multiplication with a predetermined threshold value, and when the result of the multiplication is greater than the threshold value, determine the signal exists in the input signal to detect the signal from the input signal.

15. An apparatus for detecting a signal using a cyclo-stationary characteristic value, the apparatus comprising:
a processor to control each of the following units;
a calculation unit configured to calculate cyclo-stationary characteristic values with respect to a cyclic frequency domain of an input signal, normalize the calculated cyclo-stationary characteristic values, and multiply the normalized cyclo-stationary characteristic values with each other; and
a detection unit configured to detect the signal from the input signal based on the result of the multiplication.

16. The apparatus of claim 15, wherein the calculation unit is configured to normalizing each of the cyclo-stationary characteristic values based on an RMS value.

* * * * *